United States Patent [19]

Keller

[11] 4,384,593

[45] May 24, 1983

[54] SHUTOFF ELEMENT FOR GASEOUS MEDIA WITH A DEVICE FOR DAMPING SELF-EXCITED ACOUSTICAL VIBRATIONS IN CAVITIES

[75] Inventor: Jakob Keller, Killwangen, Switzerland

[73] Assignee: BBC Brown Boveri and Company Limited, Baden, Switzerland

[21] Appl. No.: 229,540

[22] Filed: Jan. 29, 1981

[30] Foreign Application Priority Data

Mar. 10, 1980 [EP]  European Pat. Off. ........ 80200225.3

[51] Int. Cl.³ ................................................ F16K 1/32
[52] U.S. Cl. ............................ 137/630.15; 137/625.3; 251/24
[58] Field of Search ...................... 137/630.14, 630.15, 137/625.3, 625.37, 625.39; 251/118, 124

[56] References Cited

U.S. PATENT DOCUMENTS

| | | | |
|---|---|---|---|
| 2,406,243 | 8/1946 | Newton | 251/118 |
| 3,250,342 | 5/1966 | Petry | 251/124 X |
| 3,602,261 | 8/1971 | Brown | 137/625.3 |
| 3,773,085 | 11/1973 | Caldwell | 137/630.15 |
| 3,809,126 | 5/1974 | Oberle | 137/630.14 |
| 4,066,100 | 1/1978 | Schwarz | 137/625.3 |
| 4,121,617 | 10/1978 | Masek | 137/630.14 |
| 4,176,686 | 12/1979 | Stahle | 137/892 |

FOREIGN PATENT DOCUMENTS

| | | | |
|---|---|---|---|
| 2334576 | 1/1975 | Fed. Rep. of Germany | 251/118 |
| 46-14487 | 4/1971 | Japan | 137/630.14 |
| 47-20891 | 6/1972 | Japan | 137/630.15 |

Primary Examiner—Robert G. Nilson
Attorney, Agent, or Firm—Werner W. Kleeman

[57] ABSTRACT

A shutoff element for gaseous media containing a device for damping self-excited acoustical vibrations caused by a cavity in a flow channel, wherein the normally periodically altering position of the dam-up point of the flow at an impact zone of the cavity is fixed in that a damping flow is delivered out of a chamber or space of the shutoff element, where there prevails a higher pressure than in the cavity, and such flow is infed to the cavity.

2 Claims, 3 Drawing Figures

SHUTOFF ELEMENT FOR GASEOUS MEDIA WITH A DEVICE FOR DAMPING SELF-EXCITED ACOUSTICAL VIBRATIONS IN CAVITIES

BACKGROUND OF THE INVENTION

The present invention relates to a new and improved construction of a shutoff element for gaseous media containing a device or means for damping self-excited acoustical vibrations or oscillations in cavities of the like. These acoustical vibrations arise because the flow channel for the medium has a cavity in which there are located an impact zone and a dam-up point for part of the throughflowing gaseous medium.

At high flow velocities at the region of cavities, where the flow jet of the operating or working medium bears at one side against a wall and which jet of working or operating fluid medium effluxes out of a nozzle-like constriction or throat following the seat cross-section of shutoff elements, acoustical vibrations or oscillations occur at such shutoff elements. The amplitude of these acoustical vibrations reacts with great sensitivity upon the intensity of the mass flow vibrations or oscillations and the dam-up point vibrations at the impact zone of the flow at the outlet of the cavity. The more intense the dam-up point oscillations react upon the pressure oscillations in the impact zone that much more intense will there be dampened the vibrations or oscillations in the cavity.

SUMMARY OF THE INVENTION

Since such cavity vibrations or oscillations not only cause annoying operational noises, but also can result in mechanical damage or even destruction to moved components, such as spindles and spindle guides, it is a primary object of the present invention to artificially augment the damping such that the aforementioned bothersome and damaging effects are avoided or at least reduced to acceptable values.

A further significant object of the present invention aims at providing a new and improved construction of shutoff element for a gaseous medium having means for damping self-excited acoustical vibrations in cavities in a highly efficient and reliable manner.

Now in order to implement these and still further objects of the invention, which will become more readily apparent as the description proceeds, the invention contemplates providing channels or equivalent throughflow means for a damping medium flow at least at one of the boundary walls of the flow channel. These channels flow communicate a chamber or space where, during operation of the shutoff element there prevails a higher pressure than in the flow channel, with such flow channel. These channels are arranged such that the damping flow i.e. the damping flow medium delivered by such channels is infed to the cavity at the region of the impact zone of the gaseous medium at the boundary of the cavity.

BRIEF DESCRIPTION OF THE DRAWINGS

The invention will be better understood and objects other than those set forth above, will become apparent when consideration is given to the following detailed description thereto. Such description makes reference to the annexed drawings wherein.

DETAILED DESCRIPTION OF THE PREFERRED EMBODIMENTS

Figure 1:
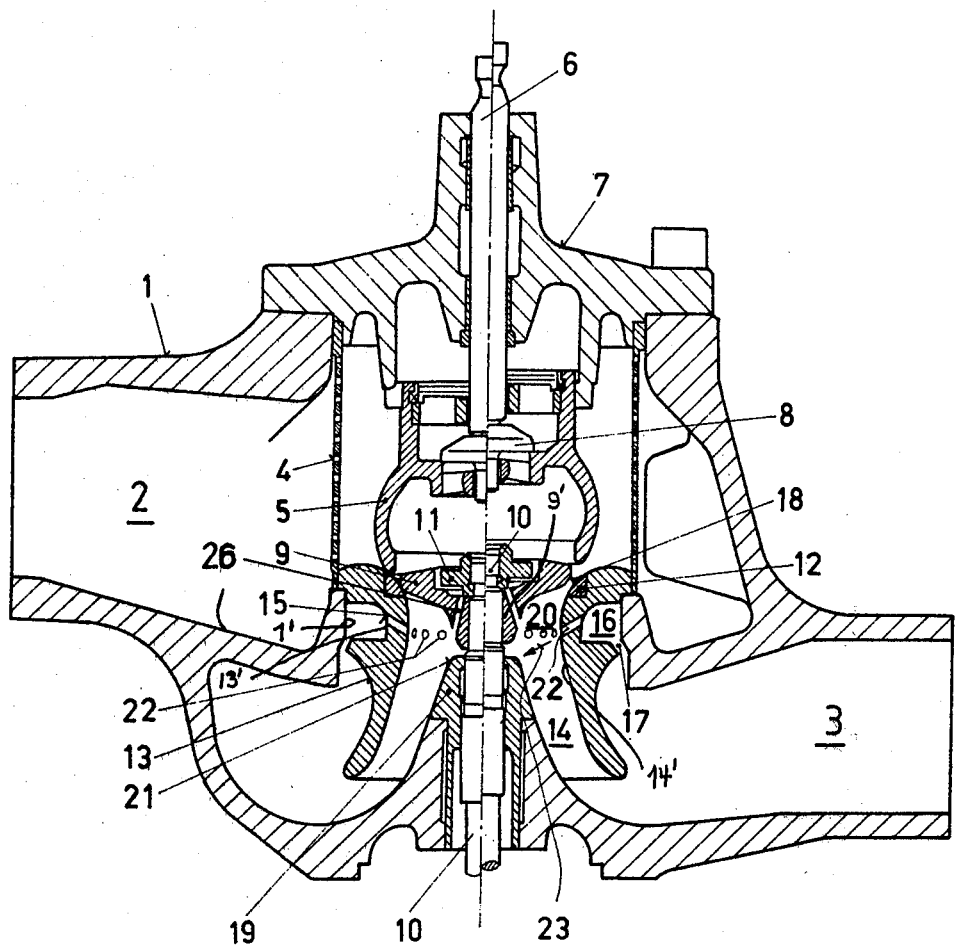
FIG. 1 illustrates in schematic sectional view a combined rapid closure and regulating valve according to the invention.

Describing now the drawings, in FIG. 1 there is illustrated by way of example a combined rapid closure and regulating valve for steam constituting the gaseous work medium. The valve housing 1 will be seen to contain an inlet flow channel 2 and an outlet flow channel 3. Viewed in the flow direction of the working medium there is located following the inlet channel 2 and a steam filter 4 a regulating globe or hood 5 which is guided, just as is its spindle 6, in a housing flange 7. At the lower end of the spindle 6 there is seated a pre-stroke or prelift valve 8 which in known manner serves for facilitating the opening operation.

Arranged coaxially within the regulating hood or globe 5 is a rapid closure valve body 9, whose spindle 10 is mounted at the lower portion of the housing 1. This spindle 10 carries at its upper end a prelift or pre-stroke valve 11 for facilitating the opening operation.

A common valve seat ring 12 is provided as the seating surfaces for both valve bodies or valve means 5 and 9. The valve seat ring 12 is embedded in a diffusor body 13. This diffusor body 13 possesses at its outer circumference, at the region of the narrowest cross-section or throat 13' of the diffusor channel or passageway 14, an annular or ring-shaped groove 15 which forms together with the neighboring bore wall 1' of the housing 1 a substantially ring-shaped space or chamber 16. Furthermore, the outer shape or contour of the diffusor body 13 is designed such that this chamber 16 flow communicates by means of a ring-shaped or annular slot 17 with the outlet channel 3 so that a flow can adjust itself towards the chamber 16, since the pressure in the outlet channel 3, during operation, is greater than the pressure at the narrowest location or throat 13' of the diffusor channel 14 at the region of the vertical extent of the ring-shaped chamber 16.

The right-half of the showing of FIG. 1 illustrates the valve bodies 5 and 9 in partially opened position and at the left-hand portion of the showing of FIG. 1 both of these valve bodies 5 and 9 have been shown in their closed position.

In the raised condition both of the valve bodies 5 and 9 on the one hand and the valve seat ring 12 on the other hand bound or limit a throttle gap 18 through which the vapor or steam can flow into the diffusor channel 14. Due to the particular geometry of the diffusor channel 14 within and below the throttle gap 18 the steam or vapor jet generally will contact the outer boundary or wall 14' of the diffusor channel 14 and impacts at the lower end of the cavity 20, for instance at the impact zone, generally designated by reference character 21, which is located at the upper edge of the spindle guide 19. The cavity 20 is bounded by the upper half of the outer contour of the diffusor channel 14 and the outer contour or surface of the high-speed or rapid closure valve body 9 as well as by the upper portion of the spindle guide 19 of the valve body 9.

Now in order to dampen the damaging cavitational vibrations or oscillations mentioned at the outset of this disclosure, there are provided in the diffusor body 13 damping bores or channels 22 which are uniformly distributed about the circumference of such diffusor body 13. These damping bores 22 enclose with the axis of the spindle 10, viewed in the flow direction of the steam, an acute angle and flow communicate the ring-shaped chamber 16 with the diffusor channel 14 at the region of the impact zone 21 of the steam jet.

By means of the ring-shaped chamber 16, which flow communicates by means of the ring-shaped or annular slot 17 with the outlet channel 3, there is produced a damping flow, generally indicated schematically by the arrow 23, which flows into the afore-mentioned impact zone 21, since during operation the pressure in the outlet channel 3 is greater than the mean pressure in the cavity 20 at the region of the impact zone 21. Since the bores 22 open at the region of the impact zone 21 there is effectuated blocking of the cross-section of the cavity 20 which leads to an increased mass flow into the cavity at the region of the impact zone 21 and thus produces the inventive damping of the cavitation vibrations or oscillations. However, the pressure in the ring-shaped chamber 16, to the extent possible, should only be slightly greater than the mean pressure in the cavity 20, since with only slightly higher pressure the mass flow through the bores 22 already reacts to quadratic small pressure fluctuations in the impact zone 21 and the vibrations of the dam-up point in the impact zone 21 therefore will be particularly intensively augmented.

Instead of using the ring-shaped space or chamber 16 the cavity 20 also can be connected in flow communication with any other pressure reservoir where the pressure, as above explained, is somewhat greater than in the cavity 20.

Figure 2:
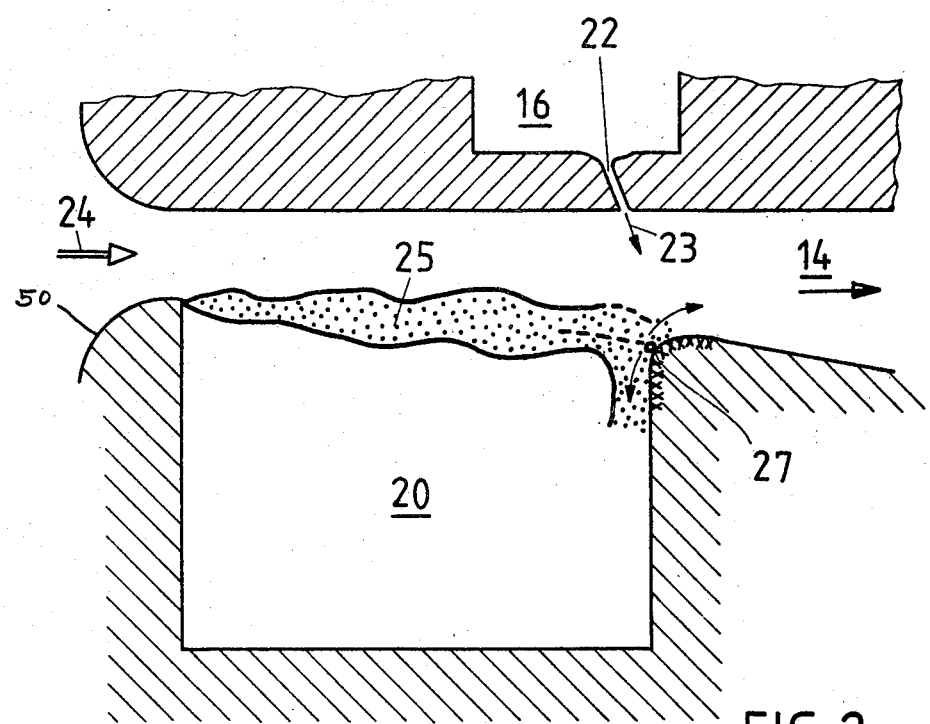
FIGS. 2 and 3 respectively illustrate exemplary embodiments of cavity configurations or shapes.
Figure 3:
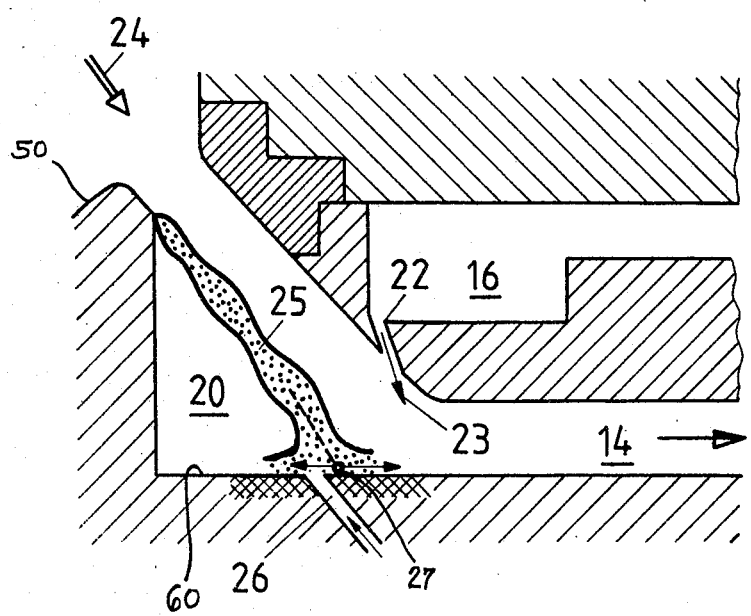

FIGS. 2 and 3 schematically illustrate configurations of cavities 20 as the same likewise are present at valves or other shutoff elements, but also at other gas or steam conducting machine components. In these FIGS. 2 and 3 there have been conveniently designated with the same reference characters the same or analogous elements discussed heretofore in conjunction with the description of FIG. 1.

Based upon the illustrated cavities 20 of FIGS. 2 and 3 there will be briefly explained hereinafter once again the mechanism of damping the cavity vibrations. The fluid medium or flow jet 24, generally schematically represented by the arrow, and effluxing out of the throttle location 50, initially compactly enters the diffusor channel 14. During its flow past the cavity 20 there is withdrawn therefrom energy at the shear layer 25 which has been somewhat accentuated by points or dots in the drawings of FIGS. 2 and 3. A part of this energy loss is predicated upon the delivery of pulses to molecules of the working medium at the shear layer 25, which is entrained by the flow jet 24 out of the cavity 20, while the rest is then converted into accoustical vibrations and thermal energy.

A spontaneous damping of such vibration is realized by periodically infeeding medium at the region of the impact zone into the cavity 20, whereby the most pronounced infeed occurs in each case during that phase when there prevails at the region of the impact zone minimum pressure. The medium which is infed to the cavity 20 in this manner continuously replaces the medium entrained by the jet 24 out of such cavity. In this way there is realized an equilibrium of the mean pressure in the cavity 20. By artificially increasing the infeed of medium into the cavity 20 it is possible to effectively augment the above-explained damping mechanism.

Depending upon the arrangement of the damping bores 22 for the outflow of the medium from the space or chamber 16 this damping flow 23 will retard the jet 24, so that part thereof, as shown in FIGS. 2 and 3, will be forced into the cavity 20, or the medium delivered through the damping bores 22 will be introduced from the damping bores 22 with the same effect directly into the cavity 20 and due to the thus caused additional infeed of medium there will be dampened the oscillations or vibrations in the cavity 20. The latter case prevails with an arrangement, as illustrated in FIG. 3, of damping bores or channels 26 at the internal boundary or wall 60 of the cavity 20. In this case the inflow location is located upstream of the dam-up point 27, whereas in the case of the bores or channels 22 it is located downstream of the dam-up point 27.

From the illustration of FIG. 3 it will be seen that the damping bores, wherein generally such can be constituted by any suitably configured channels or passages, can be used in conjunction with shutoff elements both in the outer boundary wall of the diffusor body of a shutoff element and also at the central portion or region of the diffusor body. In the latter case there could be used, for instance, among other things the flow serving for relieving the valve opening through the pre-stroke valve for feeding the damping bores.

FIG. 1 shows such damping bores 26 at the hub 9' of the high speed or rapid closure valve body 9. These damping bores 26 flow communicate by means of the inflow channel of the pre-stroke valve 11 when the regulation globe or hood 5 is opened, with the inlet channel 2 constituting the space which is at higher pressure. The throttling of these damping bores 26 is to be coordinated such that, as already stated, the pressure of the damping flow only is somewhat greater than the pressure prevailing in the cavity 20. With a given shutoff element or another suitable component having a cavity causing acoustical vibrations or oscillations the damping bores or channels 22 and 26 in each case can be provided alone or in combination, as the case may require.

While there are shown and described present preferred embodiments of the invention, it is to be distinctly understood that the invention is not limited thereto, but may be otherwise variously embodied and practiced within the scope of the following claims. Accordingly,

What I claim is:

1. In a shutoff element for a throughflowing gaseous medium containing means for damping self-excited acoustical vibrations which arise by virtue of the fact that a flow channel for the gaseous medium contains a cavity where there are located am impact zone and a dam-up point for part of the throughflowing gaseous medium, the improvement wherein said damping means comprises:

said flow channel having boundary walls;

channel means provided at least at one of the boundary walls of the flow channel;

means for defining a space in which, during operation of the shutoff element, there prevails a higher pressure than in the flow channel;

said channel means flow communicating said space with said flow channel for delivering from the space to the cavity a flow medium for damping the acoustical vibrations;

said channel means being arranged such that the damping flow medium, delivered from the space to the cavity, is infed substantially to the region of the impact zone of the gaseous medium from a boundary of the cavity;
a valve housing having a bore;
said flow channel being constructed as a diffusor;
said space which is at higher pressure being bounded by a substantially ring-shaped groove provided at a diffusor body in said bore of said valve housing;
an outlet channel;
a ring-shaped slot means for flow communicating said space with said outlet channel so that part of the through-flowing gaseous medium recirculates as the damping flow medium;
a rapid closure valve containing a hub;
a means for guiding a spindle on which said rapid closure valve with its hub is mounted in said flow channel, said spindle guiding means having its upper edge constituting the dam-up point in the impact zone; and
said channel means being structured as damping bores for flow communicating the space with the flow channel and being arranged such that the damping flow medium impinges flow downstream of the dam-up point at the impact zone.

2. In a shutoff element for a throughflowing gaseous medium containing means for damping self-excited acoustical vibrations which arise by virtue of the fact that a flow channel for the gaseous medium contains a cavity where there are located an impact zone and a dam-up point for part of the throughflowing gaseous medium, the improvement wherein said damping means comprises:
said flow channel having boundary walls;
channel means provided at least at one of the boundary walls of the flow channel;
means for defining a space in which, during operation of the shutoff element, there prevails a higher pressure than in the flow channel;
said channel means flow communicating said space with said flow channel for delivering from the space to the cavity a flow medium for damping the acoustical vibrations;
said channel means being arranged such that the damping flow medium, delivered from the space to the cavity, is unfed substantially to the region of the impact zone of the gaseous medium from a boundary of the cavity;
said flow channel is constructed as a substantially ring-shaped diffusor;
a rapid closure valve containing a hub and provided with a prelift valve having an inflow channel;
a means for guiding a spindle on which said rapid closure valve with its hub is mounted in said flow channel, said spindle guiding means having its upper edge constituting the dam-up point in the impact zone;
an outlet channel;
a ring-shaped slot means for flow communicating said space with said outlet channel so that part of the throughflowing gaseous medium recirculates as the damping flow medium;
an inlet channel defining said space which is at said higher pressure; and
at least one of said channel means being constructed as damping bores for flow communicating said inlet channel with the cavity and being provided at said hub of said rapid closure valve and flow communicating with said inflow channel of said prelift valve.

* * * * *